C. R. DISBROW.
RAILROAD TRUCK.
No. 9,068.  Patented June 29, 1852.
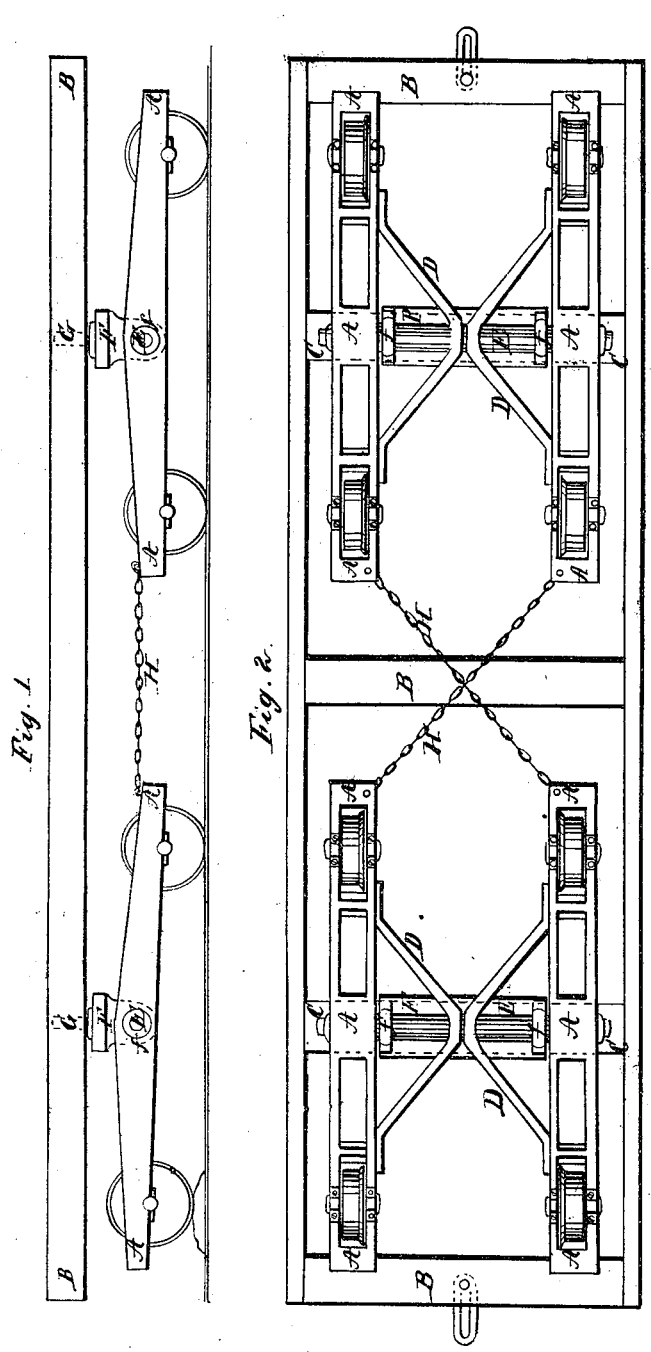

UNITED STATES PATENT OFFICE.

CALEB R. DISBROW, OF BATH, NEW YORK.

RAILROAD-CAR TRUCK.

Specification of Letters Patent No. 9,068, dated June 29, 1852.

*To all whom it may concern:*

Be it known that I, CALEB R. DISBROW, of Bath, in the county of Steuben and State of New York, respectfully represent that I have invented certain new and useful Improvements in Railroad-Trucks, which I denominate the "Broken-Frame Safety-Truck;" and I do hereby declare the following to be a full, clear, and exact description of the same, reference being had to the accompanying drawings, forming part of this specification, in which—

Figure 1, is an elevation exhibiting the trucks as placed under the platform, constituting the floor of an 8 wheel car. Fig. 2, an inverted view of the trucks, &c., for the purpose of more clearly exhibiting the same.

To enable others skilled in the art to make and use my invention, I will describe its construction and operation.

B B B the sides and ends of the platform or base of the car body; A A A side framing for the wheels, constructed of parallel side pieces sufficiently separated to receive the wheels which are provided with short axles secured in the wheels; the frames are provided with suitable pillary springs and bearings; C, C, two cross framings of B B in which are inserted the sockets for the pivots of the truck of the usual form.

D D, D D, are strong angular braces secured to the side framing of A A; E a round bar extending from each wheel frame, through which it passes as well as through the angular braces D D, allowing free play of the wheel frames and braces; it is provided with suitable shoulders on the inside of the framing and pins outside thereof.

F is the cross block provided with stirrup clamps embracing E; G the pivot secured on F by which the trucks are connected with the platform of the car B B; H, H cross chains securing the inner ends of the truck frames, the object of which is to guide in turning curves, but an important use is to keep the trucks from turning crosswise, if by accident they should be thrown off the track; these chains preserve the direction of the truck keeping the wheels parallel with the rail.

The cars are coupled in the ordinary manner.

The advantages and nature of my invention will be apparent at a glance; each wheel being upon its own axle, and thus a fast wheel, is not liable to the strain or torsion in turning curves, the breaking of through axles or those extending across the truck from wheel to wheel is chiefly from this cause; the objection to the loose wheel on one end of the axle, which practically is found not to answer from the difficulty of keeping oiled is also obviated. Each wheel frame being entirely independent of its fellow on the opposite side of the truck, is permitted freely to rise and fall, either on undulating surface to which the best of railroads are liable, as the undulation will not be felt in the body of the car, and the unpleasant swaying thereof prevented; but in overcoming obstacles each wheel passes over independently, not in the least degree affecting the others, which would not be the case of axles extended across the track; in Hinkly's car or truck, which for turning curves is a good contrivance this objection will be found to arise in practical application as the mere change of the vertical position of the wheel affects the safety of the truck.

By a slight lateral freedom allowed on the bar E, the wheels may accommodate themselves to slight variations in the width of the track, and with the view of obviating any difficulty from strain on the braces D D chains may be placed across the outer ends of each truck, parallel with the axles.

In turning short curves such as occur in cities the advantage of the short axle, from the bearings being close to the wheel permits it to rise and run on the rail.

Having described the nature of my improved safety truck for railroads, what I claim and desire to secure by Letters Patent is—

The construction of a truck with independent wheel frames A A A strengthened by braces D D, and connected to the opposite side wheel frame, by the bar E, extending across the truck upon which said wheel frames may vibrate, substantially in the manner and for the purposes set forth and shown.

In testimony whereof I have hereunto signed my name before two subscribing witnesses.

CALEB R. DISBROW.

Witnesses:
BENJ. FARWELL,
S. S. COOKE.